United States Patent
Lee et al.

(10) Patent No.: US 8,308,327 B2
(45) Date of Patent: Nov. 13, 2012

(54) APPARATUS AND METHOD FOR PROVIDING A FAIL-SAFE IN A HEAD LAMP APPARATUS

(75) Inventors: Young-Min Lee, Gyeongsan-si (KR); Sang-Kook Kang, Gyeongsan-si (KR); Sun-Kyoung Park, Gyeongsan-si (KR)

(73) Assignee: SL Corporation (KR)

( * ) Notice: Subject to any disclaimer, the term of this patent is extended or adjusted under 35 U.S.C. 154(b) by 514 days.

(21) Appl. No.: 12/647,735

(22) Filed: Dec. 28, 2009

(65) Prior Publication Data
US 2010/0164382 A1 Jul. 1, 2010

(30) Foreign Application Priority Data
Dec. 31, 2008 (KR) .................. 10-2008-0138541

(51) Int. Cl.
*B60Q 1/04* (2006.01)
*F21V 7/00* (2006.01)

(52) U.S. Cl. ........ 362/539; 362/514; 362/545; 362/517; 315/80; 315/82

(58) Field of Classification Search .......... 362/538, 362/539, 509, 514, 516, 518, 543–545, 526, 362/464–466, 460; 315/82, 80, 77
See application file for complete search history.

(56) References Cited

U.S. PATENT DOCUMENTS

| | | | | |
|---|---|---|---|---|
| 6,457,849 B2 * | 10/2002 | Tsukamoto | .................. | 362/509 |
| 6,969,183 B2 * | 11/2005 | Okubo et al. | ................ | 362/466 |
| 7,057,504 B2 * | 6/2006 | Hayami | ....................... | 340/458 |
| 7,501,767 B2 * | 3/2009 | Hayami | ......................... | 315/82 |
| 7,690,826 B2 * | 4/2010 | Kim | ............................... | 362/545 |
| 7,708,439 B2 * | 5/2010 | Naganawa et al. | ........... | 362/514 |
| 7,914,190 B2 * | 3/2011 | Kim et al. | .................... | 362/539 |
| 7,993,043 B2 * | 8/2011 | Sazuka et al. | ................ | 362/509 |
| 8,134,295 B2 * | 3/2012 | Sasa et al. | ...................... | 315/80 |
| 2007/0217215 A1 * | 9/2007 | Lee | ............................... | 362/539 |

FOREIGN PATENT DOCUMENTS

| | | |
|---|---|---|
| JP | 2000118293 | 4/2000 |
| KR | 1020070038911 A | 11/2007 |

* cited by examiner

*Primary Examiner* — Vibol Tan
(74) *Attorney, Agent, or Firm* — Lando & Anastasi, LLP

(57) ABSTRACT

Provided is an apparatus and method for providing a fail-safe in a head lamp apparatus. In one aspect of the present invention, an apparatus for providing a fail-safe in a head lamp apparatus includes an apparatus for providing a fail-safe in a head lamp apparatus includes an optical module generating a plurality of beam patterns using a predetermined shield, a shield driving unit driving the shield in the optical module, a module driving unit controlling an irradiation angle of the optical module in leftward and rightward directions, a leveling driving unit controlling the irradiation angle of the optical module in upward and downward directions, and a controller controlling the shield driving unit, the module driving unit, and the leveling driving unit, wherein when a fail occurs to one of the shield driving unit, the module driving unit, and the leveling driving unit, the controller controls at least one driving unit which is normally operating to adjust the beam pattern or the beam irradiation angle of the optical module.

12 Claims, 10 Drawing Sheets

APPARATUS AND METHOD FOR PROVIDING A FAIL-SAFE IN A HEAD LAMP APPARATUS

CROSS-REFERENCE TO RELATED APPLICATION

This application claims priority from Korean Patent Application No. 10-2008-0138541 filed on Dec. 31, 2008 in the Korean Intellectual Property Office, the disclosure of which is incorporated herein by reference in its entirety.

BACKGROUND OF THE INVENTION

1. Field of the Invention

The present invention generally relates to a apparatus and method for providing a fail-safe in a head lamp apparatus, and more particularly, to a apparatus and method for providing a fail-safe in a head lamp apparatus, which includes a fail-safe function in a case where failure occurs to a head lamp with multiple beam patterns.

2. Description of the Related Art

In general, an automotive vehicle is required to include various illumination functions of providing a driver with a better visual field in the driving direction during nighttime driving or light devices designed for the driver to notify other drivers or road users of the driver's driving state. A head lamp, generally known as a front lighting system, is a lamp illuminating a forward path of a vehicle, which requires luminous intensity such that obstacles located 100 m ahead of the road can be recognized. Each country has different standards of the head lamp from each other. In particular, the head lamp beam has a different irradiation direction according to whether traffic keeps to the right or to the left. The head lamp is designed such that the beam of a vehicle of an LHD (Left Hand Drive) is irradiated further to the right side of the traveling direction of the vehicle, with respect to the center line of the road, the beam of a vehicle of RHD (Right Hand Drive) is irradiated further to the left side.

A vehicle head lamp in the related art provides a driver with a fixed illumination pattern regardless of the various conditions of the road. Therefore, a driver cannot have an appropriate view for a safe driving, during high speed driving when a longer distance view should be ensured, and during driving in the downtown area where dependency on the amount of light of the head lamp decreases due to the surrounding illumination being relatively bright, during driving in the heavy rain where glare on the opposite side increases due to reflected light from rain, snow or a wet road and the view becomes narrow.

An adaptive front lighting system (AFLS) has been developed to improve the visibility of the road ahead for a driver and avoid glare for drivers who are driving in the opposite direction. The AFLS changes the width and length of headlight beams according to driving conditions, road conditions, and ambient conditions. For example, the AFLS may provide separate lighting during low-speed cornering. The AFLS may also adjust the luminous intensity of a head lamp to reduce the glare for drivers who are driving on the opposite side.

However, in the event of any fail or malfunction, the AFLS cannot provide driver's visibility of the road ahead while causing glare to the eyes of drivers on the opposite side. Thus, to overcome the problems, there is a need for a device and system designed to prevent glare applied to a driver and drivers driving in the opposite direction in the event of failure or malfunction of a head lamp system.

SUMMARY OF THE INVENTION

An object of the present invention is to provide an apparatus and method including a fail-safe function in a case where malfunction occurs to the head lamp system, thereby reducing glare from the eyes of a vehicle's driver and drivers who are driving in the opposite direction.

Another object of the present invention is to provide an apparatus and method including a fail-safe function in which a beam pattern or a beam irradiation direction can be changed in a case where abnormality occurs to the lamp system.

Objects of the present invention are not limited to those mentioned above, and other objects of the present invention will be apparently understood by those skilled in the art through the following description.

According to an aspect of the present invention, an apparatus for providing a fail-safe in a head lamp apparatus includes an optical module generating a plurality of beam patterns using a predetermined shield, a shield driving unit driving the shield in the optical module, a module driving unit controlling an irradiation angle of the optical module in leftward and rightward directions, a leveling driving unit controlling the irradiation angle of the optical module in upward and downward directions, and a controller controlling the shield driving unit, the module driving unit, and the leveling driving unit, wherein when a fail occurs to one of the shield driving unit, the module driving unit, and the leveling driving unit, the controller controls at least one driving unit which is normally operating to adjust the beam pattern or the beam irradiation angle of the optical module.

According to another aspect of the present invention, a method for providing a fail-safe in a head lamp apparatus includes detecting a fail of one of shield driving unit, module driving unit and leveling driving unit, wherein the shield driving unit drives a shield of optical module, the module driving unit controls an irradiation angle of the optical module in leftward and rightward directions, and the leveling driving unit controls the irradiation angle of the optical module in upward and downward directions; and controlling at least one of the shield driving unit, the module driving unit and the leveling driving unit to adjust the beam pattern or the beam irradiation angle of the optical module when a fail occurs to one of driving units.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

Figure 1:
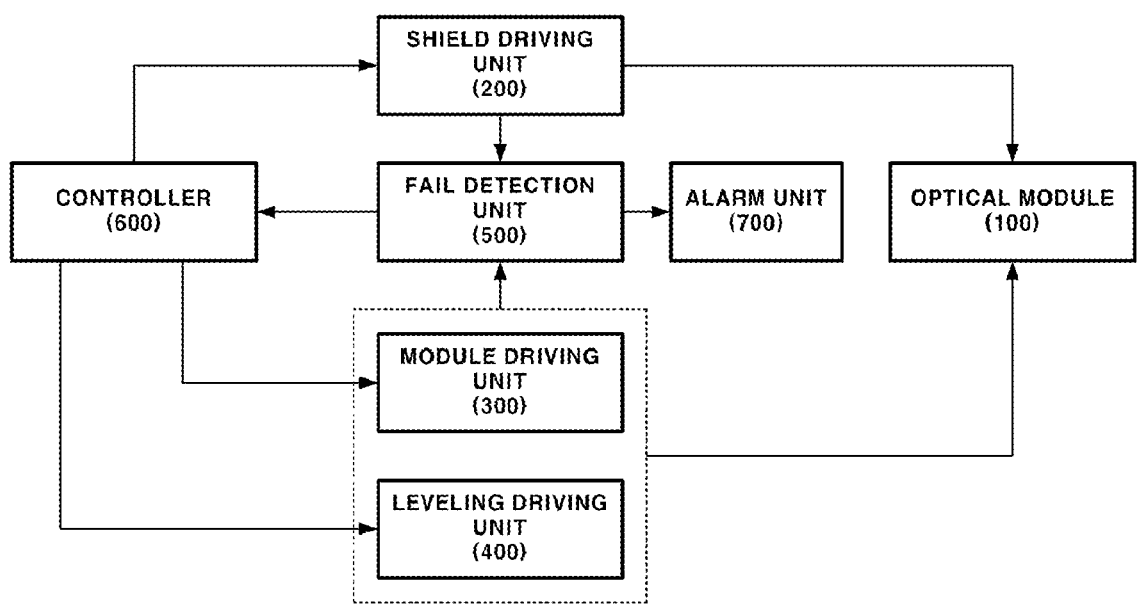
FIG. 1 is a block diagram of an apparatus for providing a fail-safe in a head lamp apparatus according to an embodiment of the present invention.

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

The present invention will now be described more fully with reference to the accompanying drawings, in which preferred embodiments of the invention are shown.

FIG. 1 is a block diagram of an apparatus for providing a fail-safe in a head lamp apparatus according to an embodiment of the present invention. Referring to FIG. 1, the apparatus for providing a fail-safe in a head lamp apparatus according to the present embodiment includes an optical module 100, a shield driving unit 200, a leveling driving unit 400, a fail detection unit 500, a controller 600, and an alarm unit 700.

The optical module 100 creates a beam pattern. The optical module 100 may include optical elements for creating a predetermined beam pattern, such as a lamp, a reflector, and a shield. The shield in the optical module 100 is designed to form multiple beam patterns, which will be described later. By rotating the optical module 100 in upward, downward, leftward, or rightward direction, the vehicular head lamp system according to the current embodiment can adjust the direction of a beam to be irradiated therefrom. The configuration of the optical module 100 will be described in more detail later.

The shield driving unit 200 drives a shield in the optical module 100 to form a predetermined beam pattern. For example, the shield driving unit 200 may rotate the shield or change the pattern of protrusions on the shield to thereby form multiple beam patterns. By using the shield driving unit 200, the adaptive front lighting (AFL) head lamp system according to the present embodiment may create multiple beam patterns of a vehicle, including beam patterns of classes RHD (Right Hand Drive) C, C, V, and E, which will be described in greater detail below.

The module driving unit 300 drives the optical module 100 in the left and right directions to adjust the direction of a beam irradiated by the optical module 100 left and right. The leveling driving unit 400 is coupled to a base 350 and rotates the base 350 so as to drive upward or downward the optical module 100 accommodated in the base 350.

Since the shield driving unit 200, the module driving unit 300, and the leveling driving unit 400 are configured to rotate or operate the shield and the optical module 100, respectively, each of them includes an actuator or driving motor for rotating or operating the corresponding one and a driving gear or driving force transmitter for transmitting generated power.

The fail detection unit 500 detects fails of the shield driving unit 200, the module driving unit 300, and the leveling driving unit 400. Here, the term "abnormality" means failure to improperly operate and cease to operate due to a malfunction. The term "fail" used herein means to commonly describe states in which beam pattern conversion and a change in the beam irradiation direction are not performed due to abnormality occurring to one of the shield driving unit 200, the module driving unit 300, and the leveling driving unit 400. The term "fail" may be referred to as a "fail mode" as well. In the fail mode, a beam pattern or a beam irradiation direction may be changed as recommended by the traffic standard or the safe mode, which is called a fail-safe.

Accordingly, a fail of the shield driving unit 200, the module driving unit 300, or the leveling driving unit 400 means that a rotation shield 210 driven by the shield driving unit 200 fails in converting a beam pattern into a predetermined beam pattern by means of the controller 600, which will later be described, by driving at least one of the shield driving unit 200, the module driving unit 300, and the leveling driving unit 400 to form the predetermined beam pattern. The fail also means that the direction of the beam irradiated from the optical module 100 rotated by the module driving unit 300 and the leveling driving unit 400 is not rotated in a predetermined direction. If such fails occur during driving or operating of a head lamp system, it is necessary to stably perform a fail-safe.

The fail detection unit 500 detects fails of the shield driving unit 200, the module driving unit 300, and the leveling driving unit 400 and transmits the detection result to the controller 600. To accomplish this, the fail detection unit 500 may include a shield fail detector (not shown) detecting the fail of the shield driving unit 200, a module fail detector (not shown) detecting the fail of the module driving unit 300, and a leveling fail detector (not shown) detecting the fail of the leveling driving unit 400.

The shield fail detector detects whether a shield rotates or whether a protrusion operates to form a predetermined beam pattern. For example, upon or even after receiving a command to convert into a predetermined beam pattern by rotating the shield, the shield fail detector may detect the non-rotation of the shield.

In order to detect the fail of the shield driving unit 200, the shield fail detector may include an encoder, a gyro sensor, or an acceleration sensor that detects the amount of rotation of the shield. Alternatively, the shield fail detector may also include an optical sensor that uses light to monitor the amount of rotation of the shield. Alternatively, the shield fail detector may use a motor sensor to detect abnormality occurring to a driving motor of the shield driving unit 200. Alternatively, the shield fail detector may also include a hall sensor that detects the amount of rotation of the shield using a magnet.

The module fail detector and the leveling fail detector determine an occurrence of a fail by detecting whether the optical module 100 moves upon being driven by the module driving unit 300 and the leveling driving unit 400, respectively. Thus, the shield fail detector may determine the occurrence of abnormality when an irradiation angle is not adjusted or irradiation direction is converted in an unintended direction, independently of a command to or being driven to move the optical module 100 in the upward/downward or left/right direction. Similar to the shield fail detector, in order to detect the fails of the module driving unit 300 and the leveling driving unit 400, each of the module fail detector and the leveling fail detector includes a gyro sensor, an acceleration sensor, or an optical sensor that detects the orientation of the optical module 100 (e.g., amount of rotation from a reference position). Alternatively, each of the module fail detector and the leveling fail detector may use a motor sensor to detect an abnormality or halt state of the driving motor. Alternatively, each of the module fail detector and the leveling fail detector may also include a hall sensor that detects the amount of rotation of the shield using a magnet.

The controller 600 controls the shield driving unit 200, the module driving unit 300, and the leveling driving unit 400. The controller 600 receives a command to convert a beam pattern or a beam irradiation direction and transmits the command to the shield driving unit 200, the module driving unit 300, and the leveling driving unit 400. The controller 600 also receives signals indicating of the occurrence of abnormality of the shield driving unit 200, the module driving unit 300, and the leveling driving unit 400 from the shield fail detector, the module fail detector, and the leveling fail detector and, when the occurrence of the fail is detected from at least one of the shield driving unit 200, the module driving unit 300, and the leveling driving unit 400, controls the other ones without a fail occurred. For example, if the shield driving unit 200 suffers a fail, the controller 600 may control the module driving unit 300 and/or the leveling driving unit 400. If the module driving unit 300 or the leveling driving unit 400 has failed to operate, the controller 600 may control the shield driving unit 200 in such a manner as to adjust a beam irradiation direction and a beam pattern formed by the optical module 100.

For example, if the shield cannot operate due to the malfunction of the shield driving unit 200 and a high beam pattern is maintained, the controller 600 may operate the module driving unit 300 and the leveling driving unit 400 so as to face down the optical module 100 and convert the high-beam pattern into a low-beam pattern.

Conversely, when the module driving unit 300 or the leveling driving unit 400 fails to operate, the controller 600 controls the shield driving unit 200 to form a predetermined beam pattern. For example, if the optical module 100 is driven by the module driving unit 300 to move left and right and then stop operating due to abnormality of the module driving unit 300, the controller 600 controls the shield driving unit 200 to convert a beam pattern into a beam pattern of class V formed by shielding the light at an upper end region of the cut off pattern, thereby preventing glare applied to drivers who are driving in the opposite direction and providing driver visibility. Thus, a minimum level of safety can be achieved while driving.

Upon detecting a fail from the shield driving unit 200, the module driving unit 300, and the leveling driving unit 400, the alarm unit 700 notifies the driver of the fail. The alarm unit 700 receives a signal indicating the fail of the shield driving unit 200 or the module driving unit 300 from the fail detection unit 500 or the controller 600 and generates at least one of an alarm sound, an alarm vibration, and an alarm light so that the driver can recognize the fail.

The vehicular head lamp system according to the present embodiment is configured to adjust a beam pattern formed by the optical module 100 as well as a beam irradiation direction in order to cope with the fail of the shield driving unit 200, the module driving unit 300, and the leveling driving unit 400 while driving. Thus, the vehicular head lamp system according to the present embodiment can provide a minimum level of safety in a sudden fail mode, thereby achieving higher reliability.

Figure 2:
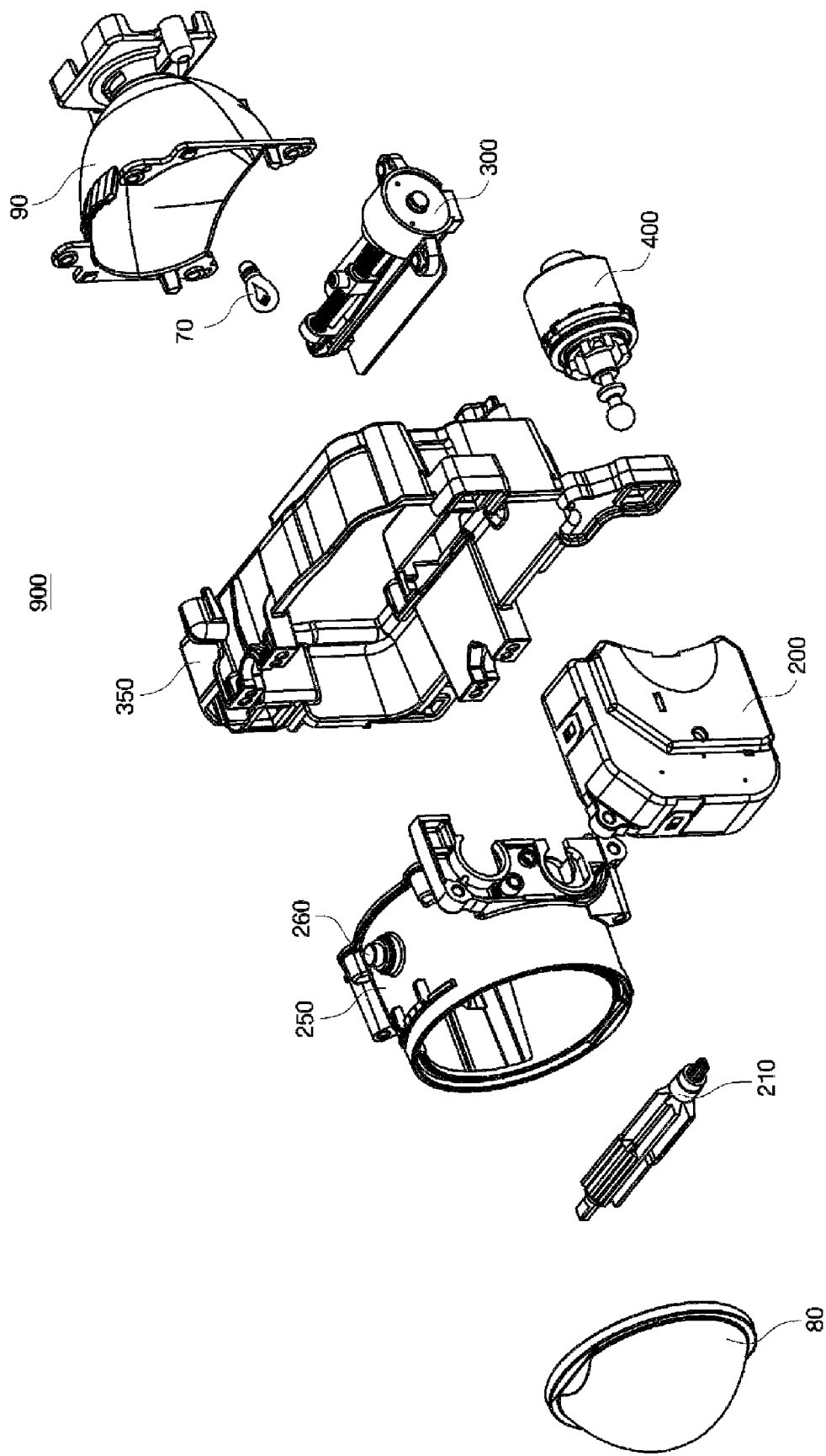
FIG. 2 is an exploded perspective view of a head lamp assembly according to an embodiment of the present invention.
Figure 3:
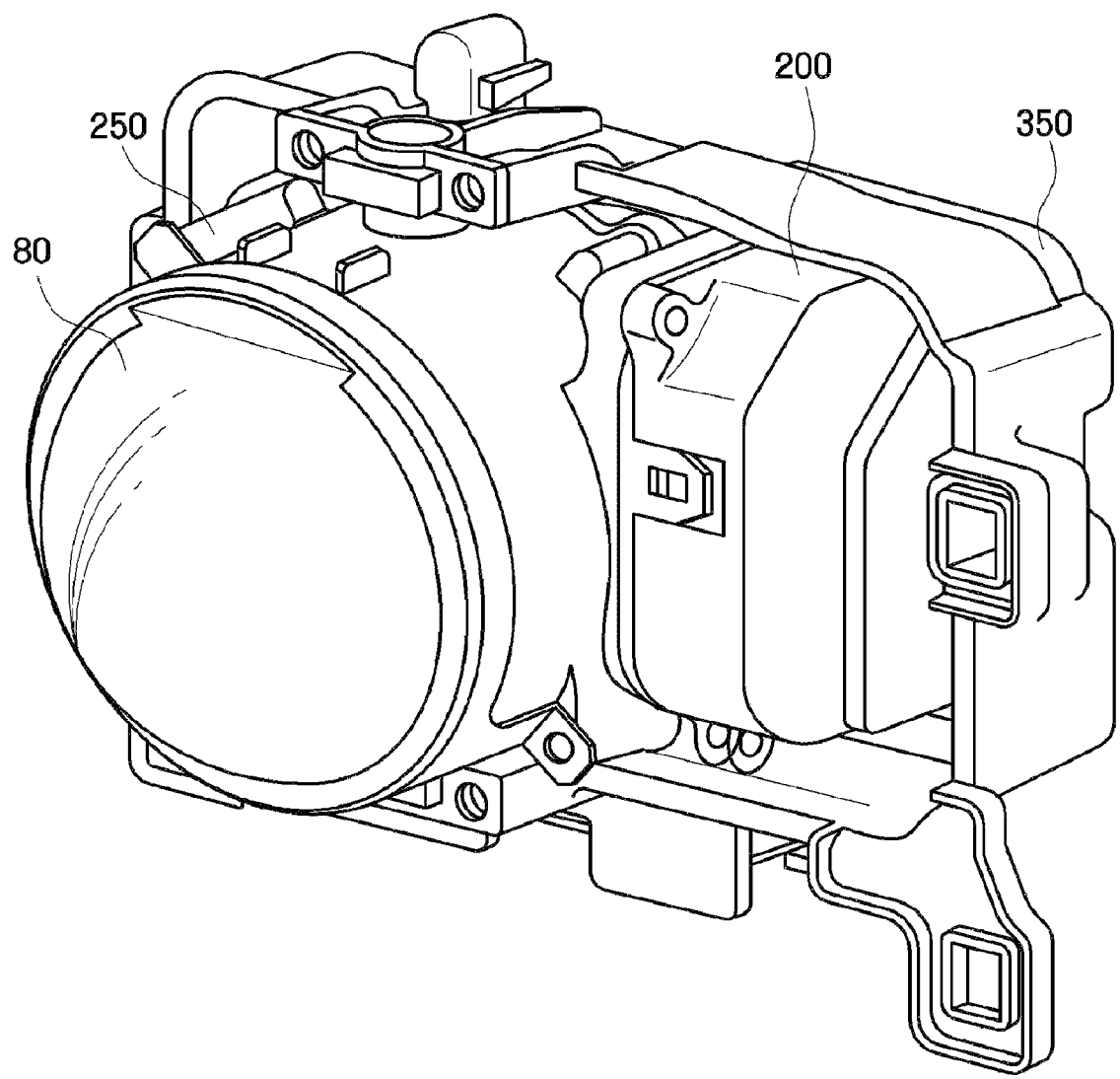
FIG. 3 is an assembled perspective view of the lamp assembly of FIG. 2.

FIG. 2 is an exploded perspective view of a head lamp assembly 900 according to an embodiment of the present invention and FIG. 3 is an assembled perspective view of the lamp assembly of FIG. 2. Here, the head lamp assembly may be called a head lamp apparatus.

Referring to FIGS. 2 and 3, the head lamp assembly 900 according to the current embodiment includes a lamp 70, a shield driving unit 200, a holder 250, a base 350, a lens 80, a reflector 90, a module driving unit 300, and a leveling driving unit 400.

The lamp 70 acts as a light source for the head lamp assembly 900. The lamp 70 may be the known lamp such as a high-intensity discharge (HID) lamp, a halogen lamp, or a light-emitting diode (LED) lamp.

The lens 80 refracts and condenses light that is irradiated by the lamp 70 and reflected and scattered from its reflecting surface (not shown) in the forward direction and irradiates the light in the same direction. The lens 80 is fitted to the holder 250 and the holder 250 is combined with the reflector 90, thereby forming an external appearance of the optical module 100.

The reflector 90 accommodates the lamp 70 and includes a reflective plate that is located behind the lamp 70 and encircles the lamp 70 so that light irradiated from the lamp 70 propagates in the forward direction. The base 350 fixes the optical module 100 to a vehicle body. The base 350 also receives a rotating shaft protrusion formed on the optical module 100 so that the optical module 100 can rotate in the left and right directions.

The shield driving unit 200 drives a shield to form a predetermined beam pattern from light irradiated by the lamp 70. The shield is designed such that some of light directly irradiated from the lamp 70 and light reflected or refracted from the reflecting surface is shielded by an upper end region of the cut off pattern to form a predetermined beam pattern. Thus, the type and shape of the shield may vary depending on a beam pattern to be formed. For example, the shield driven by the shield driving unit 200 may be a rotation shield 210. However, the shield is not limited thereto, and typical shields for forming beam patterns may be used.

The module driving unit 300 rotates the optical module 100 left or right so as to adjust the direction of light being irradiated by the light source to leftward or rightward. For example, if a vehicle turns rightward, the module driving unit 300 rotates the optical module 100 to the right so that light can be irradiated to the right relative to the direction in which the vehicle moves. On the other hand, if the vehicle turns leftward, the module driving unit 300 rotates the optical module 100 to the left relative to the direction in which the vehicle moves.

The leveling driving unit 400 rotates the base 350 upward or downward so as to adjust upward or downward the direction of light being irradiated by the optical module 100.

The head lamp assembly 900 according to the current embodiment may further include the controller (600 in FIG. 1) controlling the shield driving unit 200, the module driving unit 300 and the leveling driving unit 400, and the fail detection unit (500 in FIG. 1) detecting fails of the shield driving unit 200, the module driving unit 300, and the leveling driving unit 400.

Each of the fail detection unit 500 and the controller 600 is electrically coupled to the shield driving unit 200, the module driving unit 300, and the leveling driving unit 400 and transmits and/or receives a control signal or sensor signal.

When the fail of the shield driving unit 200 occurs, the controller 600 controls the module driving unit 300 and/or leveling driving unit 400 to operate in a fail-safe mode. When the fail of the module driving unit 300 or the leveling driving unit 400 occurs, the controller 600 controls the shield driving unit 200 to operate in a fail-safe mode.

As described above, if the head lamp assembly 900 fails to operate perfectly due to a fail of at least one of the shield driving unit 200, the module driving unit 300, and the leveling driving unit 400, the head lamp assembly 900 is designed to provide a fail-safe mechanism, thereby achieving high reliability.

Figure 4:
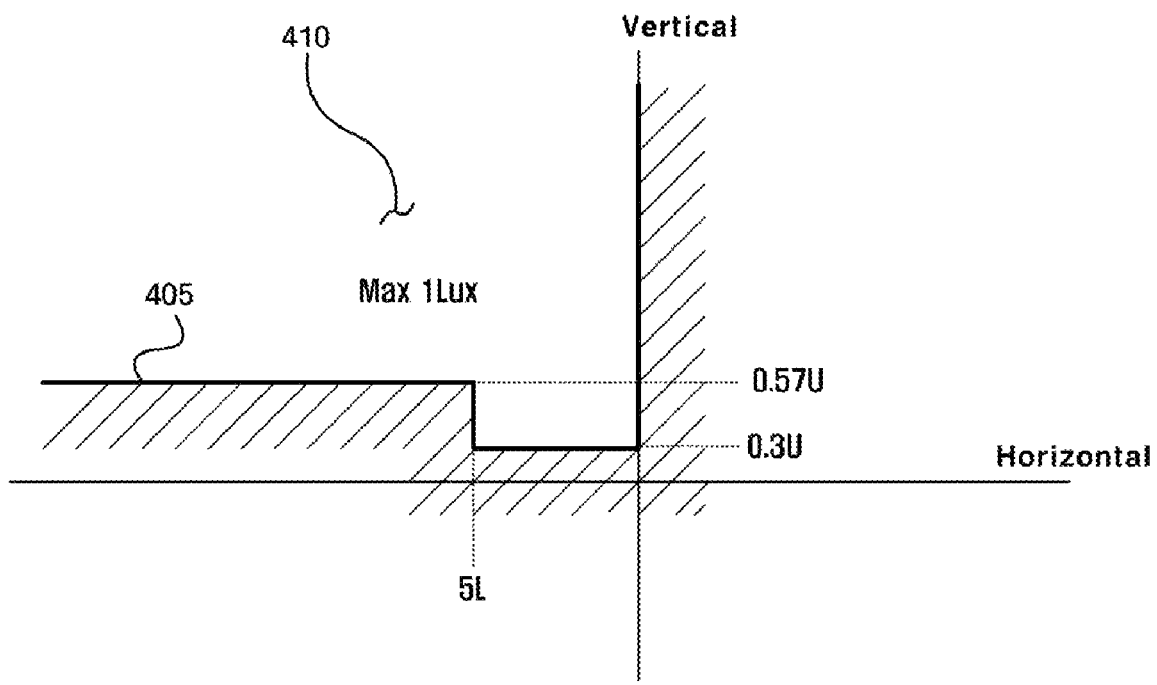
FIG. 4 is a schematic diagram showing an example of a beam pattern formed to meet the requirement in a case where there is a fail due to malfunction of a general head lamp assembly.

FIG. 4 is a schematic diagram showing an example of a beam pattern formed to meet the requirement in a case where there is a fail due to malfunction of a general head lamp assembly.

When there is a fail due to a malfunction of the shield driving unit 200, the module driving unit 300, or the leveling driving unit 400, the vision or visibility of drivers who are driving in the opposite direction is obstructed or reduced, which may result in serious safety problems. Thus, as soon as the occurrence of such a fail is detected, it is necessary to form a predetermined beam pattern as illustrated in FIG. 4.

Referring to FIG. 4, in a fail mode, the intensity of a beam irradiated on a region 410 located at an upper left position with respect to a reference line 405 (hereinafter called an "upper left region") should not exceed 1 Lux for safety reasons because the beam may cause glare to drivers of vehicles approaching from the opposite side. Thus, in the fail mode, the current regulations or recommended practices require a beam irradiated on the upper left region 410 be maintained at a predetermined brightness level or less for ensuring safe driving.

Figure 5A:
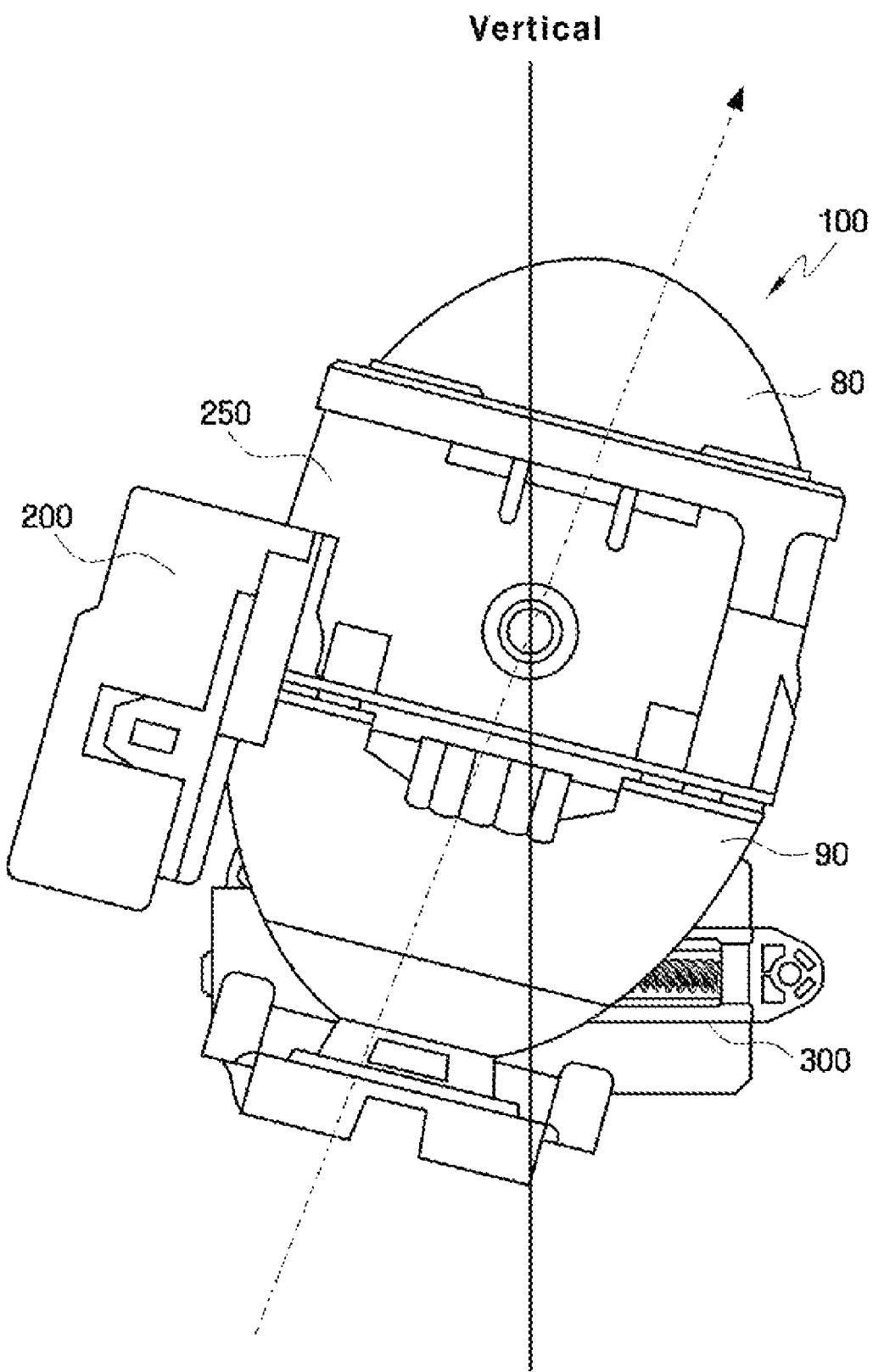
FIG. 5A illustrates an example in which the optical module is rotated by the module driving unit to the right about a vertical axis in a fail mode.
Figure 5B:
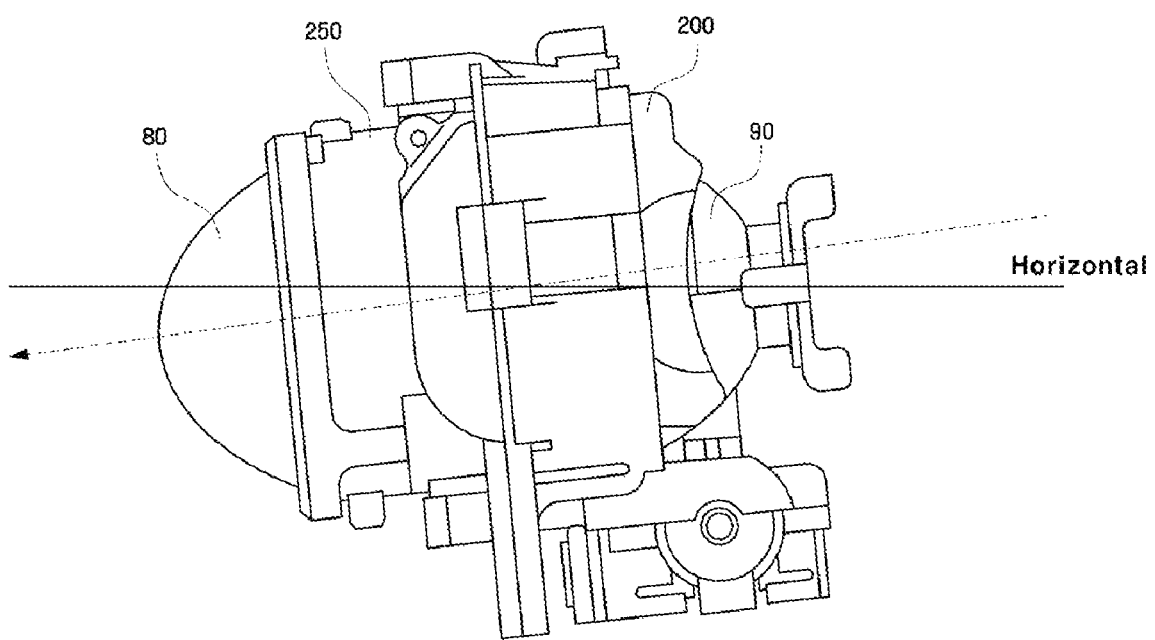
FIG. 5B illustrates an example in which the optical module is rotated downward about a horizontal axis by the leveling driving unit in the fail mode.

FIG. 5A illustrates an example in which the optical module 100 is rotated by the module driving unit 300 to the right about a vertical axis in a fail mode. FIG. 5B illustrates an example in which the optical module 100 is rotated downward about a horizontal axis by the leveling driving unit 400 in the fail mode.

For example, if a driver's vehicle is traveling using a high beam due to the fail of the shield driving unit 200, the vision of a driver on the opposite lane can be blocked. In this case, as shown in FIG. 5A, the module driving unit 300 moves the optical module 100 so as to irradiate a beam to the right with respect to the front direction, thereby reducing glare for the oncoming driver on the left lane. However, in a road situation in which cars are oncoming in the right lane, the optical module 100 can be moved in such a manner as to emit a beam to the left with respect to the front.

Further, as shown in FIG. 5B, the leveling driving unit 400 rotates the base 350 upward or downward such that a beam is irradiated by the optical module 100 downward with respect to the front direction. Thus, glare applied to the eyes of an oncoming driver's view can be reduced.

As described above, in the event of a fail of the shield driving unit 200, the controller 600 controls the module driving unit 300 and the leveling driving unit 400 to perform a fail-safe operation.

When the occurrence of the fail is detected from the module driving unit 300 or the leveling driving unit 400, an example of implementing a fail-safe mode by controlling the shield driving unit 200 is described with reference to FIG. 6.

Figure 6:
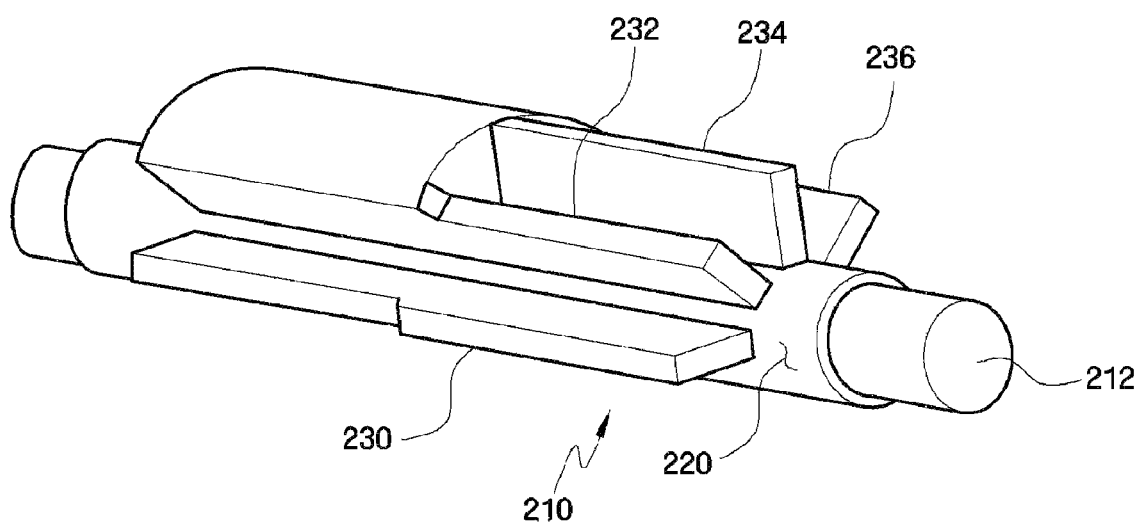
FIG. 6 illustrates an example of a rotation shield in a lamp shield driving unit according to an embodiment of the present invention.

FIG. 6 illustrates an example of a rotation shield 210 in a lamp shield driving unit according to an embodiment of the present invention.

Referring to FIG. 6, the rotation shield 210 can rotate about a rotating shaft 212. According to the current embodiment, the rotation shield 210 is rotated by the shield driving unit 200 by an angle to form a predetermined beam pattern.

The rotation shield 210 has a plurality of first through fourth shield protrusions 230, 232, 234, and 236 formed along a cylindrical outer circumference 220 thereof. The cut off pattern of an upper portion of each of the shield protrusions 230, 232, 234, and 236 may vary depending on a beam pattern to be formed. The first through fourth shield protrusions 230, 232, 234, and 236 may be disposed along the entire outer circumference at spaced angular intervals. As shown in FIG. 6, the shield protrusions 230, 232, 234, and 236 may be disposed at angular intervals only on a portion of the outer circumference thereof.

The rotation shield 210 may be operated by a shield protrusion that is disposed at the uppermost position of a vertical line passing through the rotating shaft 212. For example, as shown in FIG. 6, the third shield protrusion 234 is positioned on the vertical line passing through the rotating shaft 212 to form a beam pattern of class V. Otherwise, by rotating the rotation shield 210 around the rotating shaft 212, the first, second, or fourth shield protrusion 230, 232 or 236 may be activated to operate the rotation shield 210. The term 'activation' as used herein means that the shield protrusion fixed to the cylindrical outer circumference 220 is disposed at the uppermost position of the vertical line to bock some of the light to be irradiated in the forward direction.

When the rotation shield 210 is rotated around the rotating shaft 212, the first through fourth shield protrusions 230, 232, 234 and 236 attached to the rotation shield 210 are activated to change a beam pattern to be formed. For example, beam patterns of class RHD C and class C may be generated by activating the first and second shield protrusions 230 and 232, respectively. Beam patterns of class V and class E may be generated by activating the third and fourth shield protrusions 234 and 236. Classes of beam patterns will be described in greater detail later.

The rotation shield 210 shown in FIG. 6 is illustrated only for exemplary purpose. That is, the rotation shield 210 may be any other type having one or more shield protrusions formed along the cylindrical outer circumference 220 so as to form multiple beam patterns.

For example, when a head lamp system is in a fail mode due to a malfunction of the module driving unit 300 or the leveling driving unit 400, the luminous intensity for the upper left region (410 in FIG. 4) has to be limited. In this case, according to the present invention, the controller 600 controls the shield driving unit 200 to rotate the rotation shield 210, thereby forming a low-beam pattern or a beam pattern of class V. The low-beam pattern may be any one of classes RHD C, C, V and E, but a beam pattern of class V may be most suitable for a fail-safe mode. The shield driving unit 200 receives a control command from the controller 600 and activates the third shield protrusion 234 of the rotation shield 210 to thereby form a beam pattern of class V.

Thus, according to the present invention, even in the event of a fail of the module driving unit 300 or the leveling driving unit 400, the shield driving unit 200 operates to adjust a beam pattern to be irradiated by the optical module 100, thereby implementing a fail-safe operation.

Multiple beam patterns described above will now be described briefly. FIGS. 7A through 7F illustrate examples of multiple beam patterns for use in a vehicle. For example, head lamp beam patterns are classified into high- and low-beams and further sub-classified into different classes depending on condition factors, including vehicle traveling speed, road characteristics, road surface conditions, lane direction, and other factors.

Figure 7A:
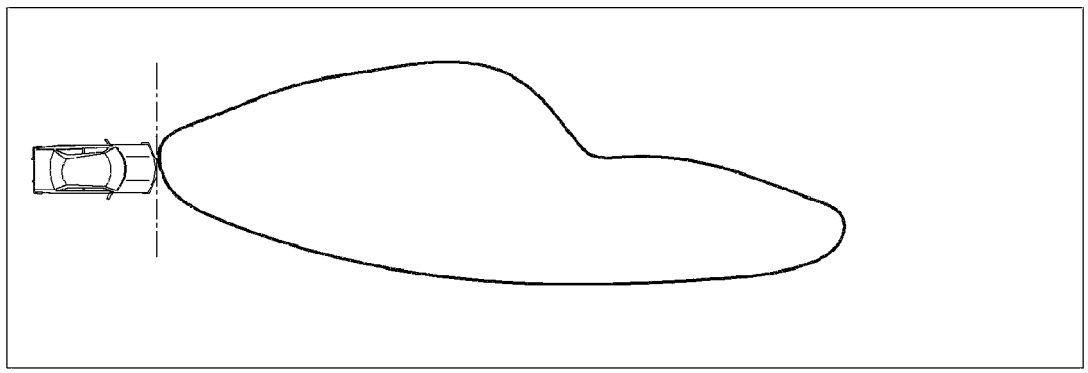
FIGS. 7A through 7F illustrate examples of multiple beam patterns for use in a vehicle.
Figure 7B:
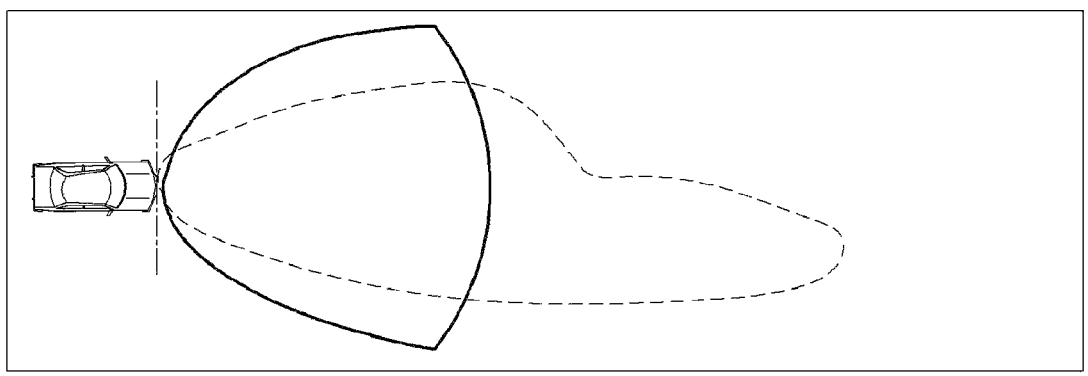
Figure 7C:
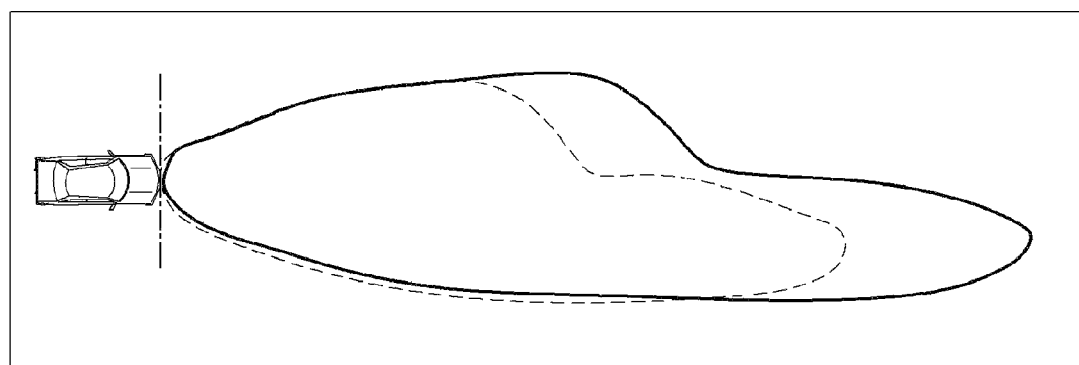
Figure 7D:
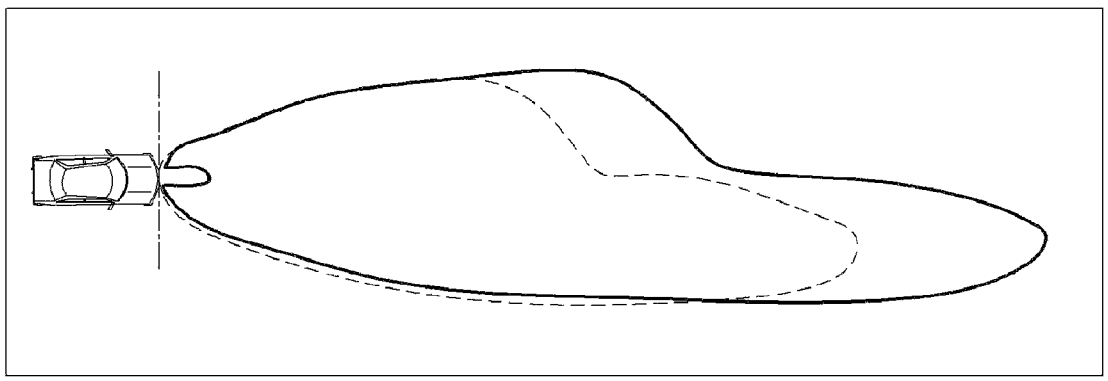
Figure 7E:
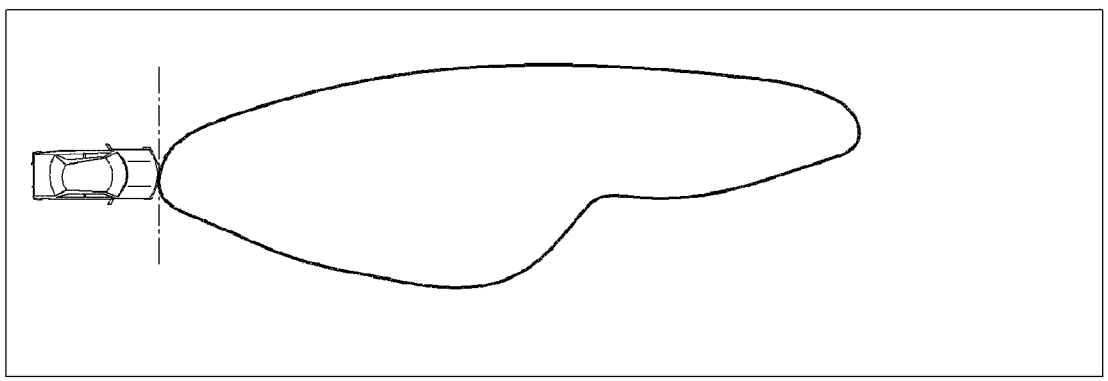
Figure 7F:
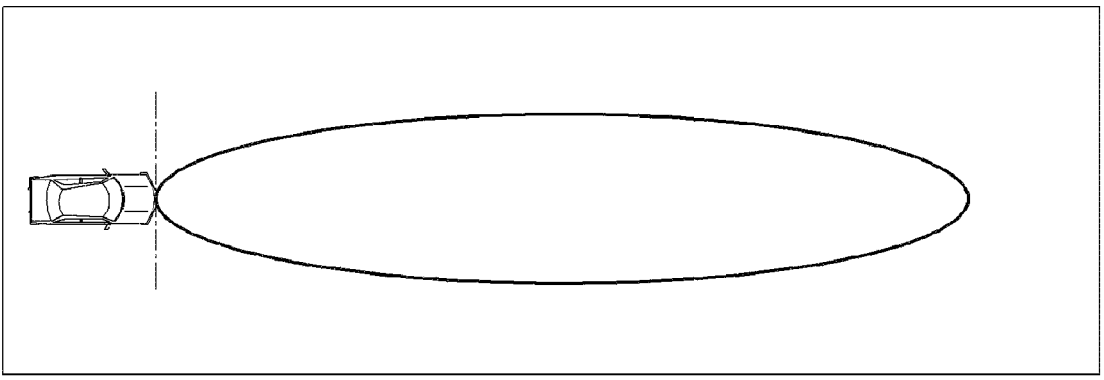

In this case, dotted lines shown in FIGS. 7B, 7C, and 7D can be understood as beam patterns of class C and are illustrated for purpose of comparison with other beam patterns. Class H shown in FIG. 7F is called a high-beam designed to illuminate the road over a long distance ahead of a vehicle and is suitable for the situation in which there are no cars in front of the vehicle traveling at high speed.

Class RHD C is suitable when traffic changes from the right side to the left side with respect to the vehicle. Consequently, the beam pattern 22 is symmetrical with respect to a beam pattern 30 of class C shown in FIG. 5C.

Class C shown in FIG. 7A is suitable when the vehicle travels on a country road or there is no need to adopt other types of beam pattern. Class C is a typical low-beam pattern.

Class V shown in FIG. 7B is suitable for the case in which the vehicle travels under bright ambient conditions, such as a downtown area. For example, in the downtown area, the vehicle may drive at the speed of 60 km/h or less and under the road surface brightness of 1 cd/m$^2$ or higher. In particular, a left/right view increases as compared to that of class C, a view of a shorter length (50 to 60 m ahead of a vehicle) than class C is ensured.

Class E shown in FIG. 7C is suitable when the vehicle travels on a highway or a straight road. Therefore, class E has a slightly longer forward long distance view than class C.

Class W shown in FIG. 7D is suitable when the vehicle travels in the rain, or on a wet road. Therefore, the forward long distance view of class W is similar to that of class E, but the amount of light is decreased up to 10 to 20 m ahead of a vehicle to reduce reflective glare.

Figure 8:
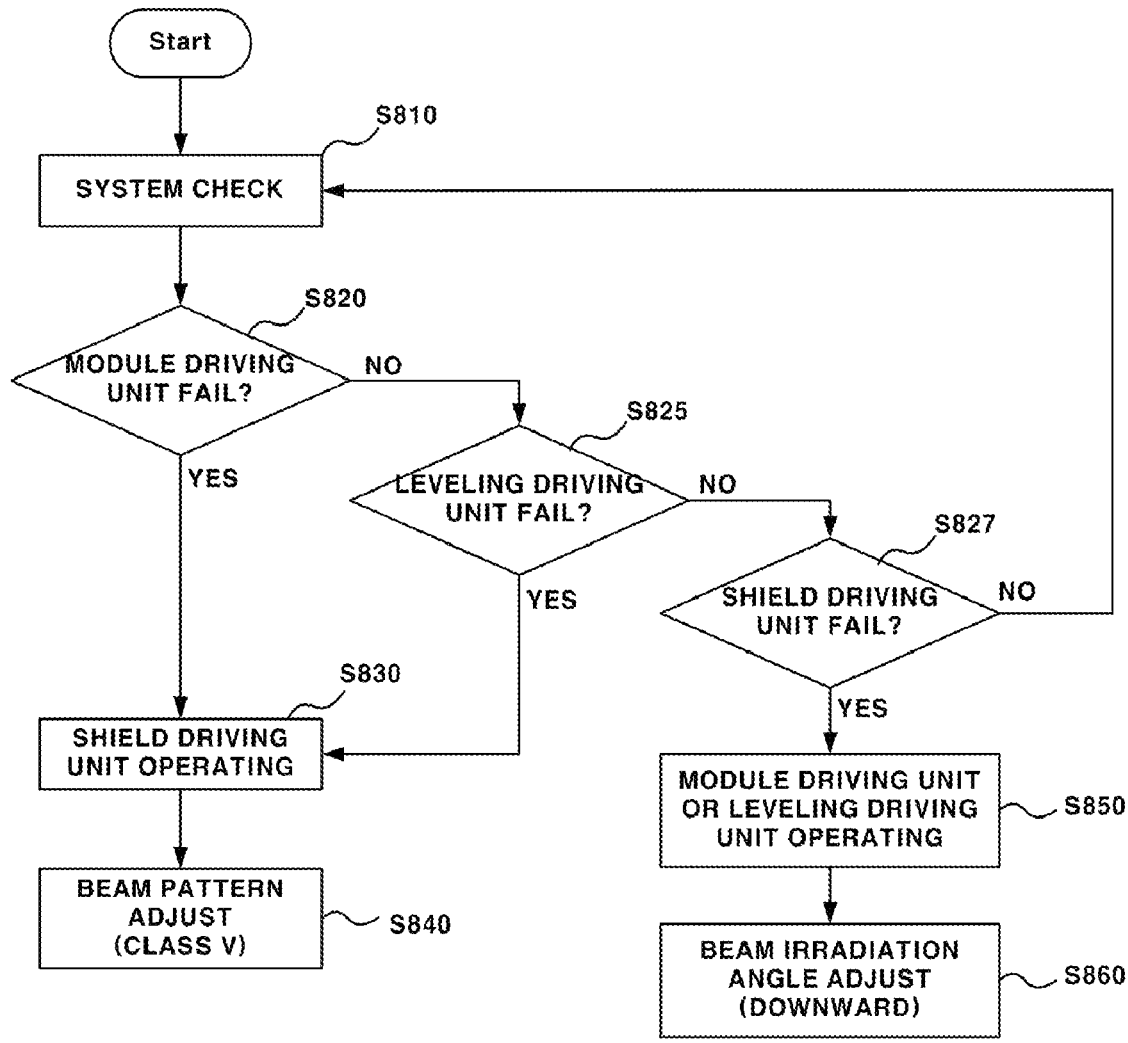
FIG. 8 is a flowchart of a method for providing a fail-safe in a head lamp apparatus according to an embodiment of the present invention.

FIG. 8 is a flowchart of a method for providing a fail-safe in a head lamp apparatus according to an embodiment of the present invention.

Referring FIG. 8, the controller 600 checks a head lamp apparatus (S810).

After checking the head lamp apparatus, the controller 600 determines an occurrence of a fail by detecting abnormality of each of driving unit 200, 300, 400. For example, firstly the controller 600 detects a fail of module driving unit 300 (S820). If the fail of module driving unit 300 is not detected, the controller 600 detects a fail of leveling driving unit 400 (S825). Also, if the fail of leveling driving unit 200 is not detected, the controller 600 detects a fail of shield driving unit 200 (S827).

If the fail of the module driving unit 300 is detected, the controller 600 drives the shield driving unit 200 (S830). The driving of the shield driving unit 200 adjusts to form a predetermined beam pattern, for example class V (S840).

Also, if the fail of the leveling driving unit 400 is detected, the controller 600 drives the shield driving unit 200 (S830). The driving of the shield driving unit 200 adjust to form a predetermined beam pattern (S840).

In addition, if the fail of the shield driving unit 200 is detected, the controller 600 drives the module driving unit 300 or the leveling unit 400 (S850). The driving of the module driving unit 300 or the leveling unit 400 adjusts beam irradiation angle of the optical module 100, for example downward (S860).

As shown above, an embodiment of the present invention controls at least one driving unit which is normally operating to adjust the beam pattern or the beam irradiation angle of the optical module when the fail occurs to one of the shield driving unit, the module driving unit, and the leveling driving unit.

While the present invention has been particularly shown and described with reference to exemplary embodiments thereof, it will be understood by those of ordinary skill in the art that various changes in form and details may be made therein without departing from the spirit and scope of the present invention as defined by the following claims. It is therefore desired that the present embodiments be considered in all respects as illustrative and not restrictive, reference being made to the appended claims rather than the foregoing description to indicate the scope of the invention.

What is claimed is:

1. An apparatus for providing a fail-safe in a head lamp apparatus comprising:
an optical module generating a plurality of beam patterns using a predetermined shield;
a shield driving unit driving the shield in the optical module;
a module driving unit controlling an irradiation angle of the optical module in leftward and rightward directions;
a leveling driving unit controlling the irradiation angle of the optical module in upward and downward directions; and
a controller controlling the shield driving unit, the module driving unit, and the leveling driving unit,
wherein when a fail occurs to one of the shield driving unit, the module driving unit, and the leveling driving unit, the controller controls at least one driving unit which is normally operating to adjust the beam pattern or the beam irradiation angle of the optical module.

2. The apparatus of claim 1, wherein when a fail occurs to the shield driving unit, the controller controls the module driving unit or the leveling driving unit to adjust the beam irradiation angle of the optical module.

3. The apparatus of claim 1, wherein when a fail occurs to the module driving unit or the leveling driving unit, the controller controls the shield driving unit to rotate the shield, thereby reducing the amount of light in an upper region of a cut off line in the beam pattern.

4. The apparatus of claim 1, further comprising a fail detection unit detecting fails of the shield driving unit, the module driving unit, and the leveling driving unit.

5. The apparatus of claim 4, wherein the fail detection unit includes at least one of a gyro sensor, an acceleration sensor, a hall sensor and an optical sensor measuring the amount of rotation of the shield and detecting the fail of the shield driving unit.

6. The apparatus of claim 4, wherein the fail detection unit includes at least one of a gyro sensor, an acceleration sensor, a hall sensor and an optical sensor measuring the amount of rotation of the optical module by the module driving unit or the leveling driving unit and detecting the fail of the module driving unit or the leveling driving unit.

7. The apparatus of claim 1, further comprising an alarm unit notifying a driver of a fail in the shield driving unit, the module driving unit, and the leveling driving unit.

8. The apparatus of claim 1, further comprising a base that accommodates the optical module so that the optical module can rotate left or right and is driven by the leveling driving unit to rotate upward or downward.

9. The apparatus of claim 1, wherein the shield is a rotation shield including at least one shield protrusions formed on an outside thereof so as to form different beam patterns, and
wherein when the fail occurs to the module driving unit or the leveling driving unit, the controller controls the shield driving unit to activate the at least one shield protrusion of the rotation shield, thereby reducing the amount of light in an upper region of cut off line in the beam pattern.

10. A method for providing a fail-safe in a head lamp apparatus comprising:

detecting a fail of one of shield driving unit, module driving unit and leveling driving unit, wherein the shield driving unit drives a shield of optical module, the module driving unit controls an irradiation angle of the optical module in leftward and rightward directions, and the leveling driving unit controls the irradiation angle of the optical module in upward and downward directions; and controlling at least one of the shield driving unit, the module driving unit and the leveling driving unit to adjust the beam pattern or the beam irradiation angle of the optical module when a fail occurs to one of driving units.

11. The method of claim 10, the comprising at least one of the shield driving unit, the module driving unit and the leveling driving unit comprises controlling the module driving unit or the leveling driving unit to adjust the beam irradiation angle of the optical module, when a fail occurs to the shield driving unit.

12. The method of claim 10, the comprising at least one of the shield driving unit, the module driving unit and the leveling driving unit comprises controlling the shield driving unit to rotate the shield, thereby reducing the amount of light in an upper region of a cut off line in the beam pattern, when a fail occurs to the module driving unit or the leveling driving unit.

* * * * *